No. 655,318. Patented Aug. 7, 1900.
E. WINANS.
POWER TRANSMITTING MECHANISM.
(Application filed Nov. 14, 1899.)
(No Model.)
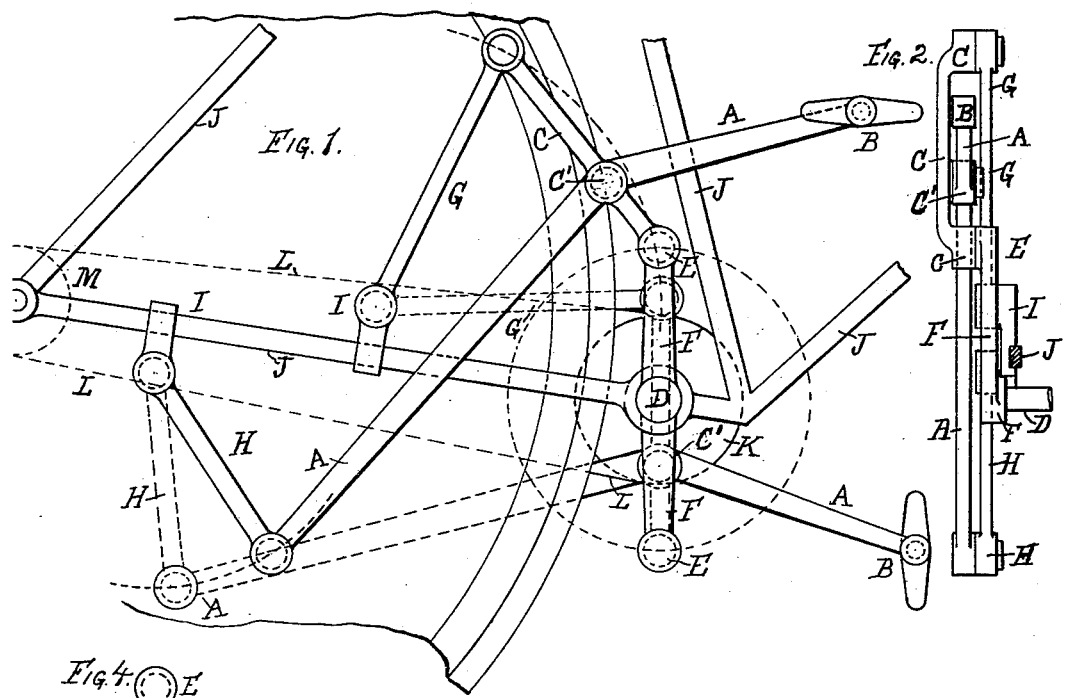
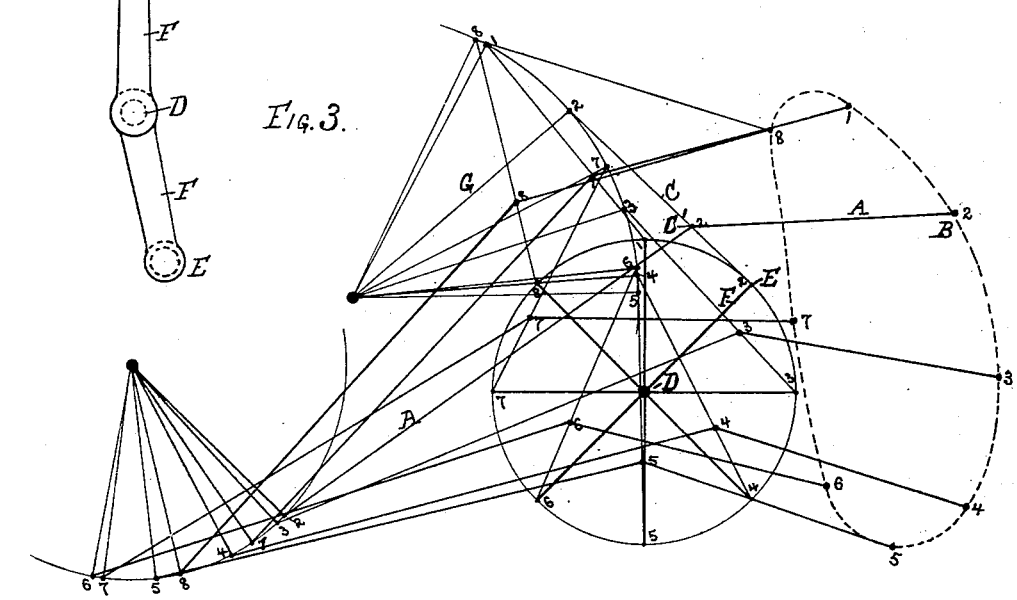
WITNESSES:-
INVENTOR:-
Edwin Winans
by Wm H. Weightman
atty

UNITED STATES PATENT OFFICE.

EDWIN WINANS, OF NEW YORK, N. Y.

POWER-TRANSMITTING MECHANISM.

SPECIFICATION forming part of Letters Patent No. 655,318, dated August 7, 1900.

Application filed November 14, 1899. Serial No. 736,928. (No model.)

*To all whom it may concern:*

Be it known that I, EDWIN WINANS, a citizen of the United States, residing in the city, county, and State of New York, have invented certain new and useful Improvements in Power-Transmitting Machinery, of which the following is a specification, reference being had to the accompanying drawings.

My invention relates to and has for its object the improvement of machinery by and through which power or force is transmitted from the place of development to that of its applied usefulness. It is applicable to all circular, swing, and crank motions, especially to all of the treadle class—namely, the bicycle, the sewing-machine, the lathe, the jigsaw, and like apparatus. It is also applicable to the transmission of the higher powers and forces of the steam and pressure classes, especially where a free, even, and unhampered revolution of the crank and connecting shafting is desired. It is specially applicable to high duty in bicycle practice, the essential features of which are presented herewith.

A general aim and object of the invention is to ease the labor and motion of an operator in treadling by providing for a full, free, and ready up-and-down swing of the leg, foot, and ankle while at work and an even, steady, and regular revolution of the operating-shaft.

Certain of my improvements consist in the adaptation, combination, and arrangement of the several parts, portions, or details to assist in crank operation, passing of centers, and power transmission, as hereinafter shown, described, and claimed.

In the accompanying drawings, Figure 1 represents an elevation of power-transmitting cranks, side rods, and bearings representing an apparatus embodying my improvements and invention applied to the framework of a bicycle, the bicycle-wheel being represented of disk form with all spokes omitted, the several connections or portions thereof on the off side of the wheel being dotted for purposes of clearer distinction. Fig. 2 represents a partial side elevation showing the relative position of detail parts. Fig. 3 represents an outline diagram illustrating the varying positions of the several pieces and details during periods of a single crank revolution. Fig. 4 illustrates an angular position of cranks hereinafter referred to.

In the several figures of the drawings letter A designates a force-receiving lever, said force being applied to and received by a pin, treadle, or projection B, and thence transmitted, by means of a connecting pin or bearing C', through a side rod C to a crank-shaft D by means of its pin E and crank F, causing said shaft to revolve.

To effect a steady and controlled revolution of crank-shaft D and a ready passing of its centers, as well as to provide for a full, free, and easy up-and-down swing of the treadle-pin B, as in bicycle practice, oppositely-suspended guides and controlling-arms G and H are located and made available, as represented at suspension points or centers I, to guide the movement of the side rod C in its transmission of force and motion from the lever A to the crank-shaft D. At K, L, and M are shown means for power transmission beyond crank-shaft D. K and M may be belt, sprocket, or similar wheels for transmission, and L may be belt, sprocket-chain, or equivalent means.

In bicycle practice the framing, as designated at J, is made use of as a means for securing the several operating details. In other practice foundations, bearings, or framework are used for the purpose, according to the work desired and amount of power to be transmitted.

It will be noted in Fig. 3 that the working motion of pin B develops a free, full, and easy curve from a point a little in advance of position 1 to and through position 5, while the return movement is shorter and approximately a straight line. The diagram Fig. 3 illustrates the relative positions at eight points of the crank circle of the several detail parts while performing a complete crank revolution. Position 1 shows the crank F at extreme upper reach, the treadle being well past the upper reach and on a downward move, controlling-arms H and G being each within their extreme throw or reach and side rod C as at all periods well above the crank. Position 2 shows the controlling-arm G as having moved downward a good stretch, the force-receiving lever A moving with it, the side rod C at a perpendicular to crank F and a direct pressure upon the same, controlling-arm H having in the meanwhile moved to an extreme position. Position 3 shows the crank at a horizontal position, side rod C at an angle of about forty-five degrees thereto, controlling-arm G still moving downward, with arm H on a return. Position 4 shows the force-receiving lever well on its downward move, side rod C decreasing its angle with the crank, controlling-bar G almost to its extreme downward throw, H moving backward. Position 5 shows the crank at an extreme downward throw, side rod C approximately parallel with or covering the crank, controlling-arm G at its lowest position, while arm H remains some distance from an extreme reach, the treadle being at its lowest point of swing. Return positions 6, 7, and 8 show a quick, flat, and easy return motion of the treadle, almost a straight-line upward movement developed by headway or by an associate crank taking its share of the work. Thus by and through the use of the controlling-arm G the controlled positions of the force-receiving lever A are such that at all the downward and most valuable positions of crank revolution the pressure upon the crank is at a liberal angle and at the best reach of the force-receiving lever. It will be noted that through the use of this controlling-arm G, although the crank in position 1 is at a perpendicular, the treadle and force-receiving arm has moved past its highest point or position, the side rod C in its connection with the force-receiving lever is well behind and pushing the crank to its revolution or work movement. Again, as movement takes place toward position 2 the angle of side rod C approaches a perpendicular to that of the crank, the force-receiving lever being kept back by the arm G to a most effective thrust action upon the crank at a period of best usefulness. A control of these movements can be regulated to suit any demands of operation or revolution. They may be varied to suit the capacity of the treadler. Either controlling-arm may be lengthened, the arm G especially, the two fulcrums I being brought nearer together, or more particularly the arm G may be lengthened and its fulcrum brought close to that of arm H. In fact, as long as the general sweep-line of arm G is approximately in the position shown or behind the crank at position 1 its center of motion or fulcrum may be located close to or even upon that of arm H, or, if desired, it may be located upon the arm H itself, the length of said arm G being, as already stated, immaterial to the working of the device, as long as the sweep-line is behind the crank-center.

In Fig. 1 the cranks of shaft D are placed at extreme opposite centers (or at one hundred and eighty degrees) to provide for a theoretical balancing of the motion details; but it is not essential that such should be their relative position, as the liberal and free motion of pin B or the attached treadle encourages the placing of the cranks at moderate angles with each other as additional means or measure for the passing of the crank-centers, either one of the cranks being set slightly ahead or behind, as detailed in Fig. 4.

According to the desired position of the operator or the direction of applied force the center of sweep of guide or controlling arm H may be varied in position, (raised or lowered,) moving the curve of sweep of pin B or treadle in or out at top or bottom, as desired.

What I claim as new, and desire to secure by Letters Patent, is—

1. In a power-transmitting device, the combination of a crank-shaft; a side rod, the inner end of which connects with said crank-shaft; a force-receiving lever connecting with said side rod, and a pair of pivoted guide-links connecting, one with the outer end of said side rod, the other with fulcrum end of said force-receiving lever, substantially as set forth.

2. In a power-transmitting device, the combination of a crank-shaft, a plurality of cranks attached at moderate angles to each other; side rods, the inner ends of which connect with said cranks; associate force-receiving levers connecting with said side rods; and associate pairs of pivoted guide-links connecting, one with the outer ends of associate side rods, the other with the associate fulcrums of said force-receiving levers, substantially as set forth.

EDWIN WINANS.

Witnesses:
 WM. H. WEIGHTMAN,
 A. W. P. CRAMER.